United States Patent
Carnell et al.

(10) Patent No.: US 12,165,316 B2
(45) Date of Patent: Dec. 10, 2024

(54) MEDICAL IMAGE ANALYSIS SYSTEM AND METHOD FOR IDENTIFICATION OF LESIONS

(71) Applicant: UCB Biopharma SRL, Brussels (BE)

(72) Inventors: Andrew Robert Carnell, Brussels (BE); Joeri Nicolaes, Brussels (BE)

(73) Assignee: UCB Biopharma SRL, Brussels (BE)

( * ) Notice: Subject to any disclaimer, the term of this patent is extended or adjusted under 35 U.S.C. 154(b) by 285 days.

(21) Appl. No.: 17/607,307

(22) PCT Filed: Apr. 28, 2020

(86) PCT No.: PCT/EP2020/061748
§ 371 (c)(1),
(2) Date: Oct. 28, 2021

(87) PCT Pub. No.: WO2020/221737
PCT Pub. Date: Nov. 5, 2020

(65) Prior Publication Data
US 2022/0222816 A1 Jul. 14, 2022

(30) Foreign Application Priority Data
Apr. 29, 2019 (EP) .................................... 19171682

(51) Int. Cl.
*G06T 7/12* (2017.01)
*G06T 7/00* (2017.01)
*G06T 15/08* (2011.01)

(52) U.S. Cl.
CPC ............ *G06T 7/0012* (2013.01); *G06T 15/08* (2013.01); *G06T 2207/10088* (2013.01);
(Continued)

(58) Field of Classification Search
CPC ................... G06T 7/0012; G06T 15/08; G06T 2207/10088; G06T 2207/20076;
(Continued)

(56) References Cited

U.S. PATENT DOCUMENTS

2009/0123378 A1* 5/2009 Wong ................. A61K 49/0004
424/9.2
2017/0097347 A1* 4/2017 Eastman ................ G16B 20/00
(Continued)

FOREIGN PATENT DOCUMENTS

EP 3 392 832 A1 10/2018
WO WO 2015191613 A1 12/2015

OTHER PUBLICATIONS

Search Report for PCT/EP2020/061748.
(Continued)

*Primary Examiner* — Charlotte M Baker
(74) *Attorney, Agent, or Firm* — Davidson Kappel LLC

(57) ABSTRACT

A machine-based learning system for predicting the presence of lesions indicative of axial spondyloarthritis in medical imaging data includes an image processor for receiving and processing one or more MRI image data set containing pelvic region and sacroiliac joint of a subject, and dividing said MRI image data set into a set of 3D voxels. The system also includes a voxel classifier for calculating for each of said the voxels one or more class probabilities of such voxel to contain a lesion of a particular type or being a non-lesion. The system also includes a lesion probability map generator for receiving the data produced by the voxel classifier and producing a probability intensity map for each of lesion types, in which one or more areas classified as lesion are highlighted; and an image display for displaying the output of the lesion probability map generator.

26 Claims, 7 Drawing Sheets

(52) U.S. Cl.
CPC ............ *G06T 2207/20076* (2013.01); *G06T 2207/20081* (2013.01); *G06T 2207/20084* (2013.01); *G06T 2207/30012* (2013.01)

(58) Field of Classification Search
CPC . G06T 2207/20081; G06T 2207/20084; G06T 2207/30012; G06T 2207/30008
USPC .......................................................... 382/128
See application file for complete search history.

(56) References Cited

U.S. PATENT DOCUMENTS

2017/0213339 A1    7/2017    Hibbard et al.
2019/0330328 A1*  10/2019  Mann ................... A61P 19/02

OTHER PUBLICATIONS

Lecouvet Frederic E et al: "Whole body MRI in spondyloarthritis (SpA): Preliminary results suggest that DWI outperforms STIR for lesion detection", European Radiology, Springer International, Berlin, DE, vol. 28, No. 18, Apr. 17, 2018 (Apr. 17, 2018), pp. 4163-4173.

Jinzheng Cai et al., "Improving deep pancreas segmentation in CT and MRI images via recurrent neural contextual learning and direct loss function." (2017) Medical Image Computing and Computer-Assisted Interventions Conference (MICCAI). pp. 1-8.

Ozgun Cicek et al., "3d U-Net: Learning dense volumetric segmentation from sparse annotation," (2016) Medical Image Computing and Computer-Assisted Interventions Conference (MICCAI). pp. 424-432.

Kaiming He et al., "Deep residual learning for image recognition," (2016) IEEE Conference on Computer Vision and Pattern Cognition. pp. 770-778.

Sergey Ioffe et al., "Batch Normalization: Accelerating deep network training by reducing internal covariate shift," (2015) Proceedings of the 32nd International Conference on Machine Learning. pp. 448-456.

Konstantinos Kamnitsas et al., "Efficient multi-scale 3D CNN with fully connected CRF for accurate brain lesion segmentation," (2017) Medical Image Analysis. Vol 36. pp. 61-78.

Fausto Milletari et al., "V-Net: Fully convolutional neural networks for volumetric medical image segmentation," (2016) Fourth International Conference on 3D Vision. pp. 1-11.

M Rudwaleit et al., "How to diagnose axial spondyloarthritis early," (2004) Annals of the Rheumatic Diseases. Vol 63. Issue 5. pp. 535-543.

Vibeke Strand et al., "Evaluation and management of the patient with suspected inflammatory spine disease," (2017) Mayo Clinic Proceedings. Vol 92. Issue 4, pp. 555-564.

Christian Szegedy et al., "Going deeper with convolutions," (2015) Proceedings of the IEEE Conference on Computer Vision and Pattern Recognition (CVPR). pp. 1-9.

* cited by examiner

MEDICAL IMAGE ANALYSIS SYSTEM AND METHOD FOR IDENTIFICATION OF LESIONS

The present disclosure relates to medical image analysis and provides a system and a method for identification of lesions in MRI images, more specifically AxSpA lesions.

BACKGROUND

Axial spondyloarthritis (axSpA) is a chronic, debilitating autoinflammatory disease of the spine and sacroiliac joint (SIJ) which has a typical onset in early adulthood. Unfortunately, due to manifesting as various forms of backache and pelvic-area joint pain, it is frequently misdiagnosed in its early stages. The average time to a correct diagnosis from first onset is around 6 years (Strand et al, 2017). Early diagnosis, therefore, is key to improving both the quality of life of the patient and the ability to more effectively treat the disease with the appropriate treatments.

There are number of methods by which a diagnosis and/or monitoring of the condition can be performed, each providing different levels of detail from a basic likelihood of a patient having the condition right through to visual inspection of individual axSpA lesions using medical imaging data, for example.

Diagnosis of axSpA is commonly done using the Berlin algorithm (Rudwaleit et al, 2004). This was first proposed as a formal, decision-tree method of diagnosis of axSpA. The method uses a combination of the likelihood ratios of a number of clinical features such as inflammatory back pain, enthesitis, arthritis, dactylitis, acute anterior uveitis, positive family history, psoriasis, inflammatory bowel disease, and a good response to NSAIDs, which could be present in any combination in a given patient, to produce a likelihood value of the presence of axSpA for that patient. However, it is a tool purely for producing only a likelihood of a given patient actually having ax SpA. Such method provides no specificity regarding the nature or number of lesions present.

In addition to the techniques already mentioned, there are also methods that utilize biomarkers that have been found to have association with axSpA (see WO 2015/191613). The biomarker method by itself, as the Berlin algorithm, gives no indication as to the state of any lesions that may be present. Rather, it can be used in conjunction with Magnetic Resonance Imaging (MRI), which would require an expert reader to interpret correctly.

Due to the lack of on-site expert MRI readers that are required to accurately interpret patient MRI sequences in order to determine the presence of lesions that are indicative of axSpA, it is rarely possible to obtain a timely, accurate or meaningful diagnosis in the majority of cases. MRI sequences can be noisy, prone to artifacts and, crucially, will be highly dependent on the actual MRI machine settings used by the clinician performing the patient scan. This last point means that there is plenty of scope for a high variability in the image intensities captured and ultimately displayed in the clinician's viewer.

A goal of the present disclosure is to provide a system and a method of identifying lesions that are highly suggestive of axSpA and allow such identification within a timeframe of seconds/minutes of the MRI scan being performed.

SUMMARY

The present disclosure provides a medical image analysis system for predicting the presence of lesions indicative of axial spondyloarthritis in a subject, comprising:

an image processor (102) for receiving and processing one or more MRI image data set of said subject, said data containing pelvic region and sacroiliac joint (SIJ), and dividing said MRI image data set into a set of 3D voxels;

a voxel classifier (103) for calculating for each of said input voxels one or more class probabilities of such voxel to contain a lesion of a particular type or being a non-lesion, wherein such class probabilities are calculated using a computational model;

a lesion probability map generator (104) for receiving the data produced by the voxel classifier (103) and producing probability intensity map for each of lesion types, in which one or more areas classified as lesion are highlighted; and an image display (105) for displaying the output of the lesion probability map generator.

The present disclosure also provides a medical image analysis method for predicting the presence of lesions indicative of axial spondyloarthritis in MRI image data, comprising:

a) receiving one or more MRI image data set of said subject, said data containing pelvic region and sacroiliac joint (SIJ) image data;

b) dividing said MRI image data set into a set of 3D voxels;

c) calculating using a computational model for each of 3D voxels one or more class probabilities of such voxel to contain a lesion of a particular type or being a non-lesion;

d) outputting based on the calculated probabilities an indicator of presence of lesions The present disclosure further provides a medical imaging workstation comprising:

an MRI machine for generating MRI image data (101) of a subject and a system of the present disclosure for predicting for the presence of lesions indicative of axial spondyloarthritis in a subject.

BRIEF DESCRIPTION OF THE DRAWINGS

The present disclosure is described below by reference to the following drawings, in which.

DETAILED DESCRIPTION

The present disclosure uses machine learning methods to analyze medical imaging data and detect lesions characteristic for AxSpA in those images, more specifically in MRI sequences.

Figure 1:
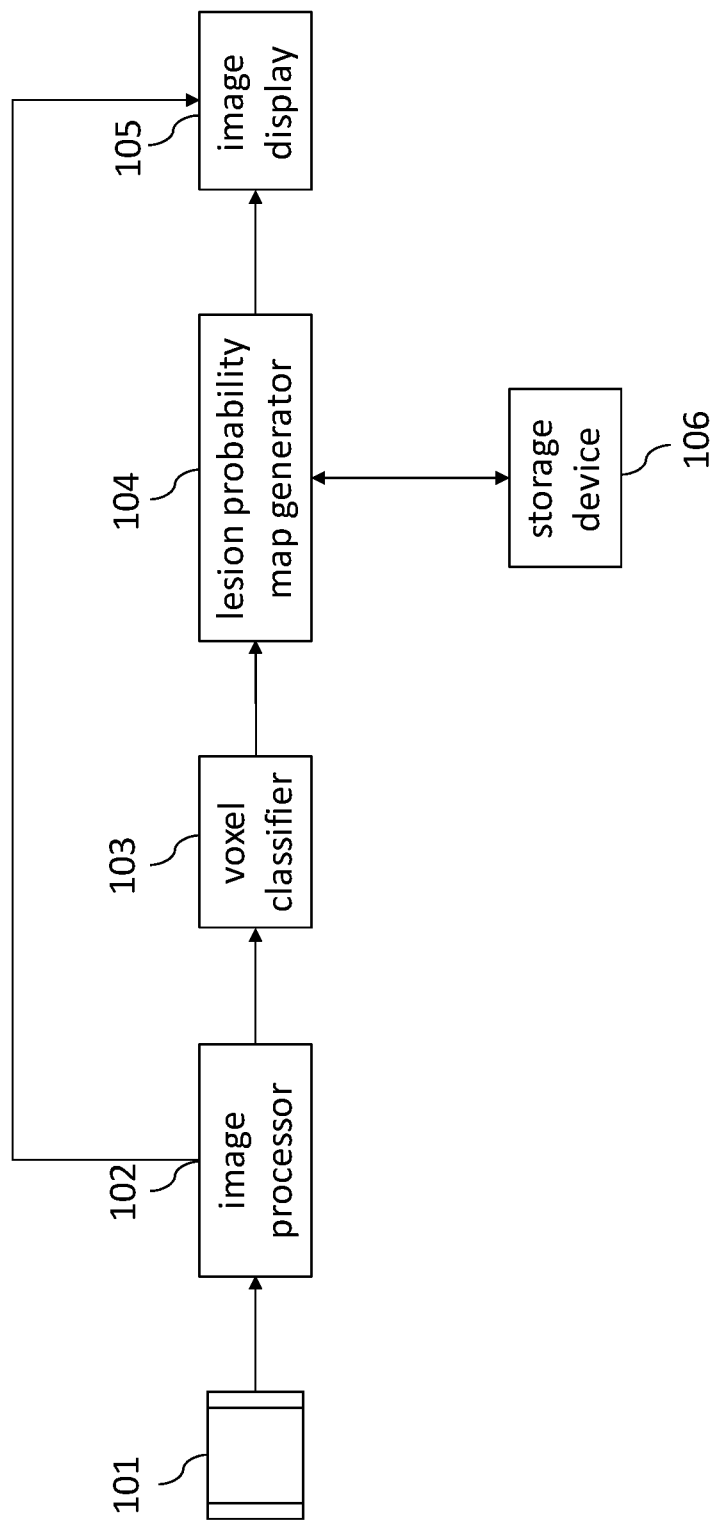
FIG. 1 is a block diagram of a system for predicting the presence of lesions indicative of axial spondyloarthritis in a subject.

The system and the methods of the present disclosure allow for the detection of the lesions in MRI that are highly suggestive of axSpA (see FIG. 1). This result is then displayed, optionally, as a visual overlay, on-screen, for the clinician/rheumatologist to use as evidence. This can be used by them for the interpretation of the patient MRI, to diagnose the patient as having axSpA, or not.

The present disclosure provides a medical image analysis system for predicting the presence of lesions indicative of axial spondyloarthritis in a subject, comprising:
- an image processor (102) for receiving and processing one or more MRI image data set of said subject, said data containing pelvic region and sacroiliac joint (SIJ), and dividing said MRI image data set into a set of 3D voxels;
- a voxel classifier (103) for calculating for each of said input voxels one or more class probabilities of such voxel to contain a lesion of a particular type or being a non-lesion, wherein such class probabilities are calculated using a computational model;
- a lesion probability map generator (104) for receiving the data produced by the voxel classifier (103) and producing probability intensity map for each of lesion types, in which one or more areas classified as lesion are highlighted; and
- an image display (105) for displaying the output of the lesion probability map generator.

Figure 2:
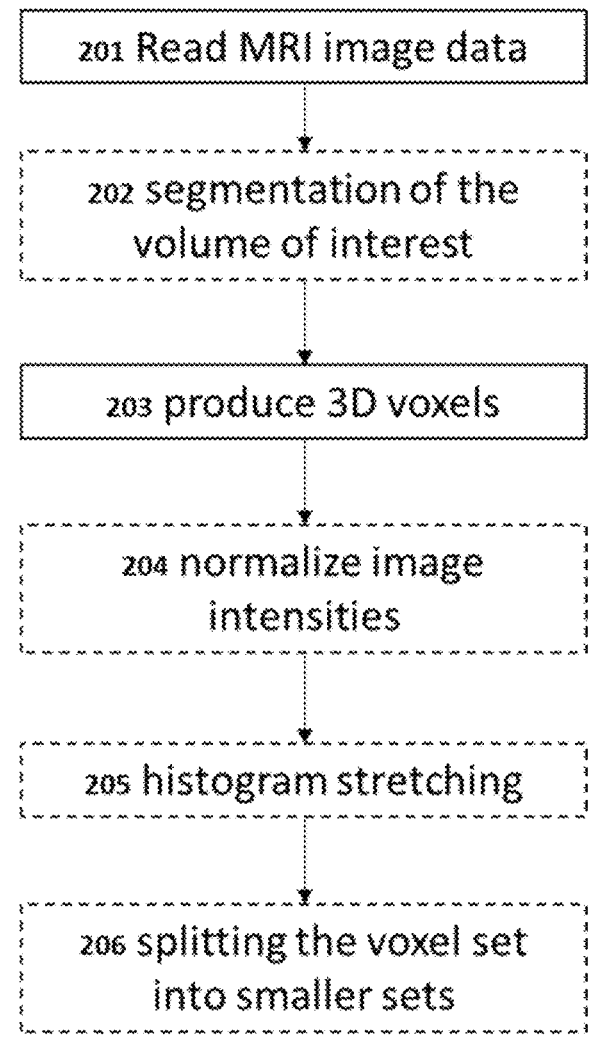
FIG. 2 is a flowchart depicting operational steps of image processor.
Figure 3:
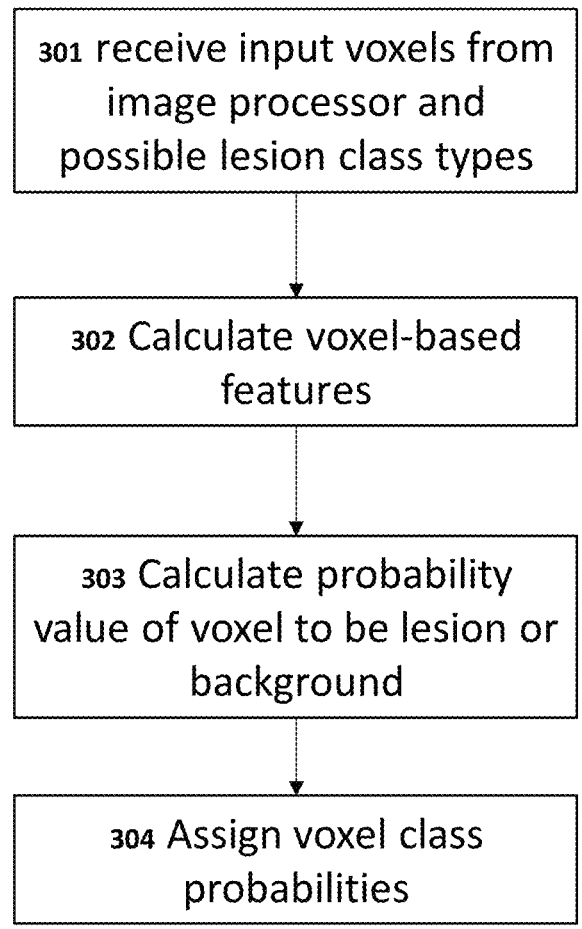
FIG. 3 is a flowchart depicting operational steps of voxel classifier.
Figure 4:
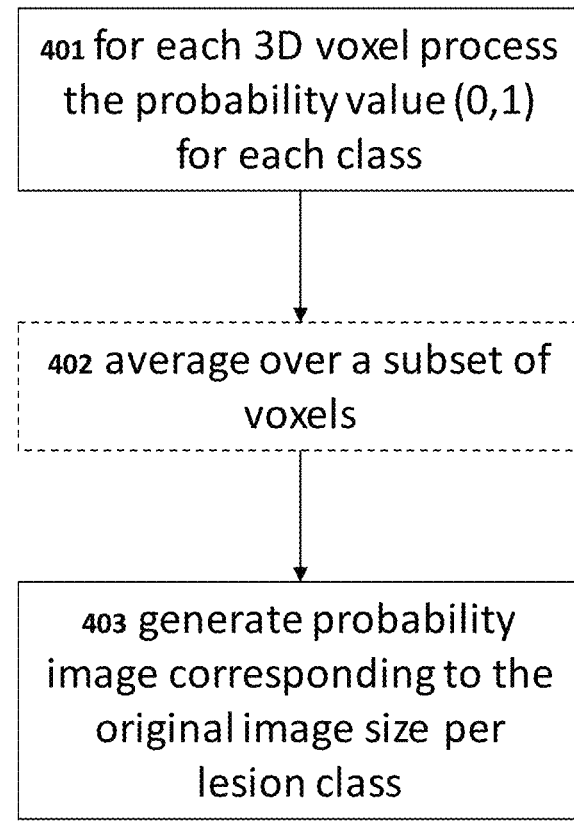
FIG. 4 is a flowchart depicting operational steps of lesion probability map generator.

Each of the elements of the system is a sub-system that is performing a specific set of steps. The exemplary steps for each of the sub-systems (elements) are illustrated in FIGS. 2-4. Each of such sub-systems can have one or more input data (or signals) and one or more outputs.

The present disclosure also provides a medical image analysis method for predicting the presence of lesions indicative of axial spondyloarthritis in MRI image data, comprising:
a) receiving one or more MRI image data set of said subject, said data containing pelvic region and sacroiliac joint (SIJ) image data;
b) dividing said MRI image data set into a set of 3D voxels;
c) calculating using a computational model for each of 3D voxels one or more class probabilities of such voxel to contain a lesion of a particular type or being a non-lesion;
d) outputting based on the calculated probabilities an indicator of presence of lesions It will be appreciated that such method can be carried out by a medical image analysis system of the present disclosure.

The present disclosure also provides a medical imaging workstation comprising:
- an MRI machine for generating MRI image data (101) of a subject and
- a system according to the present disclosure for predicting for the presence of lesions indicative of axial spondyloarthritis in a subject.

Data Types and Inputs, Image Processing

Figure 6:
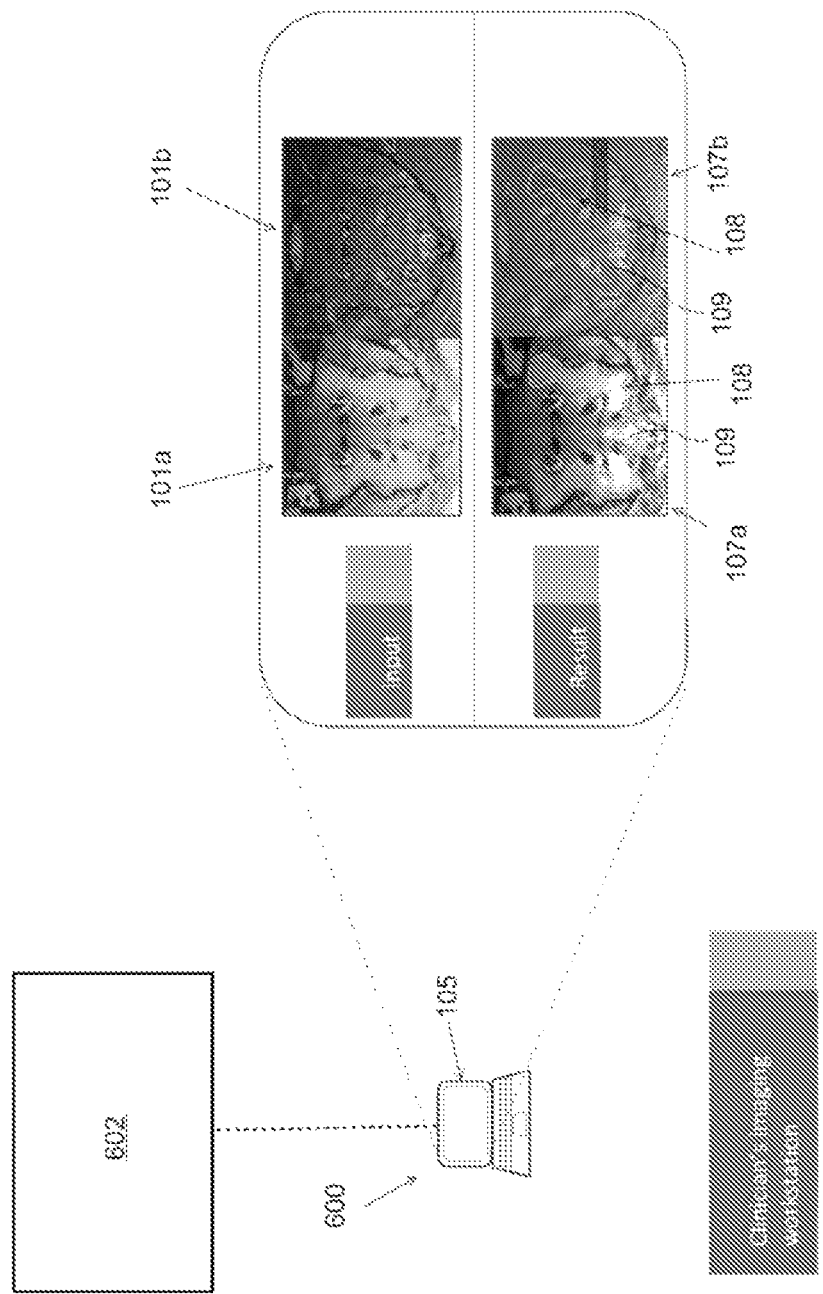
FIG. 6 shows an exemplary output of the system on a display.
Figure 7:
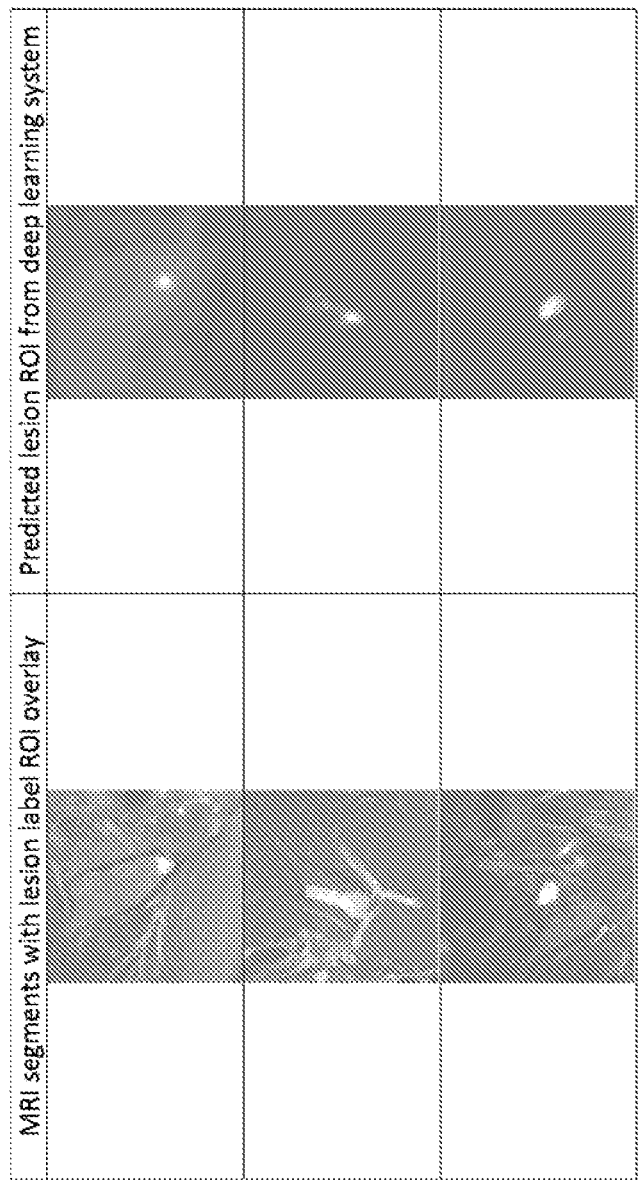
FIG. 7 shows a comparison of an output of the system compared to manual identification of lesions in the same image data.

A plurality of substeps performed by the image processor 102 are shown in FIG. 2. A first substep 201 is reading the MRI image data 101—e.g., representing an input image 101a and/or an input image 101b shown in FIG. 6—generated by a MRI machine, into a memory of the medical image analysis system. As shown in FIG. 6, the medical image analysis system can be in the form of a clinician's imaging workstation 600 connected to an MRI machine 602 directly or via a communication network. Workstation 600 includes a memory and a processor, and is provided with a non-transitory readable medium including the components 101 to 104 shown in FIG. 2. The 3D MRI image data that is provided from MRI machine 602 to workstation 600 for the purpose of image processing normally comprises data containing image intensities, and such image intensities have a dynamic signal range. The signal intensities data can be provided in the form of a Digital Imaging and Communications in Medicine (DICOM) image data.

The source data that can be used by the system and methods of the present disclosure consist of patient MRI (both T1 and STIR) sequences in raw DICOM format. However, the system is not limited to the use of DICOM format and any other suitable data format might be used.

Hence, in a particular embodiment the MRI image data is a MRI STIR sequence. In yet another embodiment the MRI image data is a MRI T1 sequence. In an alternative embodiment the MRI T1 and STIR sequences are provided to the image processor.

In one embodiment two or more sets of 3D voxels of different size are produced. This allows for subsequent classification to be performed on the same image data, but using different resolution pathways. The data in DICOM format is converted into numpy array format and resampled into voxel space. This can be done using existing open source libraries such as pydicom, DICOM-numpy. Alternatively any other suitable proprietary method could be used. The same 3D MRI data set is split into sets of voxels of different sizes. This allows to perform subsequent parallel classification of the voxels to obtain a more precise result.

Optionally, the image processor 102 can perform a substep 202 of selecting, from the MRI image data 101, a region of interest to generate a subset of the MRI image data 101 for analysis. Specifically, substep 202 can include an additional identification, extraction, and/or segmentation of the image data corresponding to the pelvic region and sacroiliac joint (SIJ) can be performed prior to processing of the MRI image data. This could be advantageous to decrease the amount of memory to be used in subsequent computational operations.

Such identification of the pelvic region and sacroiliac joint (SIJ) can be done using a segmentation method. The segmentation method can be a method based on a classification technique. Any kind of classification technique can be used, including supervised learning methods using training data.

Segmentation of the SIJ region could be done by generating a segmentation label prediction by, for example, training a Neural Network on loosely labelled SIJ regions in a number of patients. In this case, the computational model would then be trained by only using the voxels within a segmented SIJ region provided by this first segmentation step. In addition to lower memory usage during training, this approach could improve the accuracy of the end system, as the system will only make predictions in the relevant localized SIJ region.

Even though axSpA also presents in the spine, it is common that the first visible signs of the disease are seen in the SIJ and only later on in the spine. In some cases, only spinal MRI scans contain axSpA lesions—even if the SIJ does not contain any lesions. Accordingly, embodiments of the present disclosure may include spine MRI data in the region of interest selected in substep 202 to increase clinical relevance.

In one embodiment in optional substep 206 the entire set of 3D voxels can be split into smaller sets of 3D voxels by image processor 101 before performing the classification. This can be useful to improve the performance and decrease memory usage.

Image processor 101 can also perform the substep 204 of normalizing the MRI image data. There will likely be high variance in the MRI machine models and machines settings used to capture the MRI data. Due to the nature of the variety of settings of the different MRI scanners, generally the data is processed in order to clean and normalize it. This can be done using any MRI image data format, including DICOM format.

Image processor 101 can also perform the substep 205 of histogram stretching the MRI image data. Therefore, histogram stretching can be applied to the T1 and STIR sequences for each patient. Specifically, the CLAHE technique can be used [scikit-image, Contrast-Limited Adaptive Histogram Equalization, http://scikitimage.org/docs/dev/api/skimage.exposure.html]. The histogram stretching helps to mitigate the variance in image intensity and effectively creates a greater spread of the intensity values for each voxel across the full range of values.

The final pre-processing stepcan be to normalize the data. The voxel intensities can be normalized to be in the range [−1; 1].

Following the preprocessing, image processor 101 performs a substep 205 of converting the MRI image data into voxels. Additional substeps 204 and 205 are optional and can be omitted if the MRI data can be directly provided to the voxel classifier.

Classification of Voxels

The voxel classifier 103 can be configured as a computation model configured to classify the 3D voxels as being a lesion, such as an inflammatory lesion or a structural lesion, or background (not a lesion). A plurality of substeps performed by the voxel classifier 103 are shown in FIG. 3. In a substep 301, voxel classifier 103 receives the MRI image data output by image processer 102.

The computational model can be configured to predict the presence of different types of lesions. In particular the lesion class is selected from the list consisting of bone marrow oedema (BMO), bone bridge (ankylosis), perarticular fat deposition, active erosion, inactive erosion, sclerosis, intraarticular fat deposition.

BMO lesions are the most frequently occurring. The other inflammatory lesion types occur less frequently than BMO and usually together with BMO and require additional imaging techniques to be identified. Due to the higher frequency of occurrence and the more simplistic nature of the BMO lesions, it is this lesion type that was chosen to be the initial lesion to classify. As noted above with respect to substep 202, the anatomical area to be used by voxel classifier 103 can be confined to the area surrounding and including the SIJ, but can also include MRI image data for the spine.

The classification of each 3D voxel can be performed using a computational model that has been trained using a training data set containing MRI image data, wherein areas containing a lesion of a particular class have been marked and pre-classified.

FIG. 3 shows the substeps performed by voxel classifier 103, which includes a first substep 301 of receiving the MRI image data in the form of voxel sets output by image processor 101. Next, in a substep 302, voxel classifier 103 calculates voxel-based features for each voxel in the voxel set. In a substep 303, voxel classifier 103 calculates for each voxel, a probability value indicating that the voxel is part of a lesion or is merely background. Each voxel that has a probability value indicating that the voxel is part of a lesion is then analyzed to generate a probably value for each of a number of classes of lesions. For example, the voxel can receive a probability value for each of the lesion classes noted above.

In a preferred embodiment the computational model used for classification can use a Convolutional Neural Network (CNN), CNNs have been applied successfully to classification, object detection and segmentation tasks. CNN architectures have been applied to various 2D image tasks and improvements such as batch normalization (Ioffe and Szegedy, 2015), inception modules (Szegedy et al., 2015) and residual connections (He et al., 2016) have pushed performance beyond human level in the ImageNet competition (classification of objects in natural images). Surprisingly, only a small fraction of the published methods fully exploits the 3D data structure available in CT and MRI. Recent work from Cicek et al. (2016) and Kamnitsas et al. (2017) have successfully applied 3D CNNs to microscopy and MRI images with architectures optimized to cope with the increased memory and computations.

In another embodiment, the computational model can be based on Recurrent Neural Networks (RNNs) in conjunction with CNNs in a Long Short Term Memory (LSTM) type approach. In such a RNN/CNN model one could treat the individual slices of a patient MRI as being part of a temporal sequence. This would have the effect of improving the ability of the system to more correctly marry lesion prediction shapes from slice to slice, for a more accurate representation of the actual lesion shape in 3D (Cai et al, 2017)

Another alternative embodiment, the architecture of the computational model can be V-nets. These networks, which make heavy use of 3D convolutions and skip connections, have been shown to also perform well on certain medical imaging segmentation tasks. (Milletari et al, 2016).

Figure 5:
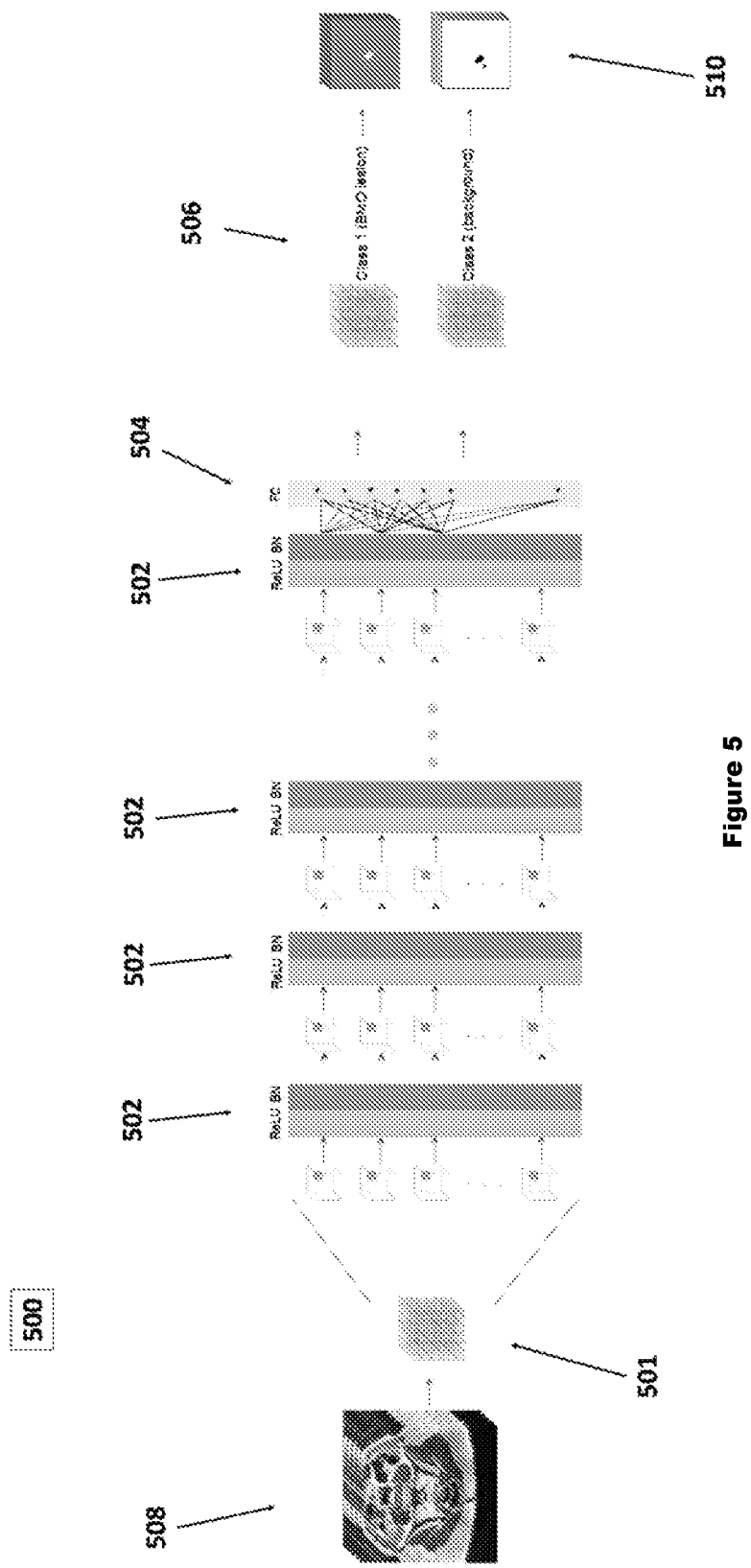
FIG. 5 shows an exemplary design of a neural network. ReLU: Rectifying Linear Unit; BN: Batch Normalization; FC: Fully Connected Layer(s).

In yet another embodiment, Generative Adversarial Networks can be utilized in order to train a system to better recognize the lesions associated with axSpA An example set of a CNN in accordance with an embodiment of the present disclosure is provided in FIG. 5. The CNN 500 shown in FIG. 5 includes twelve convolutional layers 502 and at least one fully connected layer 504. In other embodiments, the CNN can include more or less than twelve convolutional layers, including only a single convolutional layer. A classification layer 506 is provided downstream of fully connected layer 504. Output of the classification layer 506 is an array of probabilities for voxels and with each array matching the dimensional sizes of the input sub-volume for each class. As shown, 3D array sub-volume 501 of the full DICOM image data 508 from image processor 102 is input into the first convolutional layer 502 as 3D MRI image data 508 and is output from classification layer 506 as lesion class maps for the input sub-volume 501. For each set of voxels, convolutional layers 502 are configured to receive an input derived from said set of voxels in the context of the surrounding voxels to generate two or more convolved outputs. Convolutional layers 502 of depths 50, 50, 50, 100, 100, 100, 120, 120, 120, 200, 200, 200 with a 5×5×3 kernel can be used. Fully connected layers 504 are configured for aggregating said two or more convolved outputs. Classification layer 506 is configured for receiving an input from said one or more fully connected layers to perform final classification Each layer 502, 504, 506 of CNN 500 processes individual voxels using convolutions that slide a filter window across the entire input image. The filter size determines how many voxels contribute to the output of the center voxel (e.g.

a 3D filter of size 3×3×3 implies that the center voxel outputs a weighted sum of intensities from all the neighboring voxels). Typically, every layer has multiple filters to learn various features and a CNN consists of multiple layers to build a sufficiently large receptive field.

In one preferred embodiment, CNN 500 includes two fully connected layers. All layers 502, 504, 506 are trained end-to-end implying that the learned features are meaningful for the classification at hand. Cross-entropy minimization is one of the methods that might be sued to train a CNN. CNNs can be used to successfully train models on one dataset, then the learned features can be transferred to tackle a different task. The transfer learning techniques build on the observation that the first CNN layers learn generic features (e.g. edges and corners) and the higher CNN layers, such as fully connected and convoluted layers, combine these into more specific features relevant for the task at hand (e.g. face of a cat or shape of car wheels).

In a particular embodiment the computational model is utilizing a CNN comprising a set of neural network layers, wherein the sequence of neural network layers comprises:
- for each set of voxels, one or more convolutional layers configured to receive an input derived from said set of voxels in the context of the surrounding voxels to generate two or more convolved outputs;
- one or more fully connected layers for aggregating said two or more convolved outputs; and
- a classification layer receiving an input from said one or more fully connected layers to perform final classification.

The one or more convolutional layers can be designed as two convolutional layers. The use of two sets of voxels at the start (each having the same amount of voxels of different sizes) will provide two convolved outputs. Each set of voxels is being analyzed using its own separate CNN network in each layer.

The one or more connected layers allow to aggregate the outputs produced from each of the sets of voxels. The convolved outputs from one or more convolutional layers can be interpreted as learned features. When using two set of voxels (analyzed through two CNN networks), this will produce two sets of features learned in different context (e.g. one looking at high-resolution images and the other looking at bigger part of the image but lower resolution/more blurry images). The one or more connected layers add or otherwise stack these features all together in one big feature vector. The last fully connected layers process these feature vectors once more (non-linear operations) in order for the final classification layer to output one probability for every class for every voxel in the input image.

The output of the classification layer is a probability value for each voxel of the class. For an input image comprising NxMxK voxels (3D), the output is NxMxK voxels with each containing one probability value for every lesion class. The output is technically a 3D array wherein each element has a one-to-one spatial correlation with the input 3D voxel.

The classification can be performed using a computational model trained using a MRI training data set generated using a method comprising following steps:
i. receiving a MRI image data containing pelvic region and sacroiliac joint (SIJ);
ii. dividing said MRI image data into a set of 3D voxels;
iii. processing said MRI image data and generating one or more 3D layer;
iv. for each said 3D layer highlighting using a display a lesion area and providing a lesion class;
v. producing a data set containing the spatial coordinates of each highlighted area together with the lesion class label associated with it;
vi. processing said data set and generating file containing spatial coordinates and the label that is equivalent resolution to the 3D voxel set;
vii. producing for the 3D voxel set a label file containing for each of such voxels 0 or 1 per lesion class;
viii. providing computational model with the set of 3D voxels and for each lesion type, a label file containing for each corresponding voxel of the MRI image data an indication of 0 or 1 of such voxel to contain a lesion of such type.

More specifically, the following procedure was used to process the MRI sequences prior to presenting them to the neural network for training/validation. The MRI sequences themselves are standard DICOM format files generated by a range of different MRI scanners, the first step is to resample these DICOM files to create a 3d volume of voxels such that the MRI voxel volume output of each DICOM file is of the same dimensions. Both a high and a low resolution version are generated. For example, for the high-resolution voxel volumes, each voxel represents a spatial volume of dimensions 0.5×0.5×4 mm, while the voxels of the low resolution volumes are 1×1×4 mm.

The label files were created from the ROI xml files obtained for each lesion in Osirix from each of the expert readers. The xml lesion files were parsed and 3D label volumes were created from the ROI 2D points over all MRI slices for that particular MRI sequence. The 2D points were translated to the voxel coordinate system of the relevant MRI sequence of the patient and, as with the MRI voxel volumes, both a high and a low resolution version of each lesion label volume was produced.

In particular the layers in the step (ii) of the method can be 0.5-5 mm thick. Preferably, the MRI image data in such method is normalized prior to production of the 3D voxels set.

The Lesion Probability Estimation and the Lesion Probability Map

The lesion probability map produced by lesion probability map generator 104 indicates the probabilities of an MRI image data to contain a lesion of a particular class. Such probability map is produced for each class of lesions and can be produced in parallel for each class or on demand for each specific class of interest. The probability map generator receives an array of probabilities that corresponds to the original set of 3D voxels and outputs is an image data set. Typically such output can be any gray scale or color coded image, such as JPEG or PNG. Alternatively a DICOM output can be used.

Lesion probability map generator 104 receives the voxel class probabilities output by voxel classifier 103 for each lesion class and in a substep 401 processes the probability value for each class. This is done by converting the probability values into an image intensity value. In a simplest form this could be a grey scale image where the intensity of the grey scale value is related to the probability value. Next, a subset 402 includes averaging the probability value over a subset of voxels. A substep 403 then involves generating a probability image corresponding to the original image size per lesion class.

To simplify the display of the lesion probability map some values below a certain value might be removed. Hence, in one embodiment probability intensity image in which values below a particular threshold are removed. This can be performed separately for each map corresponding to different lesion types. Optionally to smoothen the image probability intensity map is produced by averaging probabilities over a subset of voxels.

To provide a data set that can be displayed on a display device such probability map can be produced in a form of an image-coded file that can be visually displayed.

Image Display and Generating an Image Overlay

The image display (105) can be configured to display one more output images—e.g., output images 107a and 107b shown in FIG. 6, which each include an overlay 108 of the data of the lesion probability map generator over the normalized MRI image data set 109. Where the medical image analysis system is in the form of a clinician's imaging workstation 600, the image display 105 is a monitor of the workstation 600. In one embodiment each lesion probability map is displayed per lesion type. This can be done per image layer or using any 3D viewer layer by layer. In that case the original 3D lesion probability map is divided into a set of layers. A layer in this case is a subset of the probability map that corresponds to a subset of 3D voxels in a layer of the original MRI image data set. A clinician might select one or more types of lesions to overlay each of the lesion probability maps over the MRI image data. Such maps can be in a form of any image format that is suitable for display, such a PNG or JPEG.

In one embodiment the image display is displaying the output of the lesion probability map generator by overlaying the output of image post-processor and the original MRI image data.

Storage and Transmittal of the Output

The system of the present disclosure may additionally comprise a storage device (106) for storing the output of the lesion probability map generator. The system can be also connected to computer network and configured to transmit the output of the lesion probability map generator and the source MRI data.

Optionally the outputs can be transmitted in a form of an image data file by using email or other commutation protocol.

Optionally the MRI image data is received and stored in a database system. The system or the imaging workstation can be configured to communicate with such database system (e.g. PACS)

Implementation of the System Components and the Method

It will be appreciated that the present disclosure also applies to computer programs, particularly computer programs on or in a carrier, adapted to put the systems and the methods of the present disclosure into practice. The present disclosure further provides a computer program comprising code means for performing the steps of the method described herein, wherein said computer program execution is carried on a computer. The present disclosure further provides a non-transitory computer-readable medium storing thereon executable instructions, that when executed by a computer, cause the computer to execute the method for predicting the presence of lesions indicative of axial spondyloarthritis in an individual as described herein. The present disclosure further provides a computer program comprising code means for the elements of the system disclosed herein, wherein said computer program execution is carried on a computer.

The computer program may be in the form of a source code, an object code, a code intermediate source. The program can be in a partially compiled form, or in any other form suitable for use in the implementation of the method and it variations according to the present disclosure. Such program may have many different architectural designs. A program code implementing the functionality of the method or the system according to the present disclosure may be sub-divided into one or more sub-routines or sub-components. Many different ways of distributing the functionality among these sub-routines exist and will be known to the skilled person. The sub-routines may be stored together in one executable file to form a self-contained program. Alternatively, one or more or all of the sub-routines may be stored in at least one external library file and linked with a main program either statically or dynamically, e.g. at run-time. The main program contains at least one call to at least one of the sub-routines. The sub-routines may also call each other.

The present disclosure further provides a computer program product comprising computer-executable instructions implementing the steps of the methods set forth herein or its variations as set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files.

It should be noted that the above-mentioned embodiments illustrate rather than limit the present disclosure, and that those skilled in the art will be able to design many alternative embodiments without departing from the scope of the claims. In the claims, any reference signs placed between parentheses shall not be construed as limiting the claim Use of the verb "comprise" and its conjugations does not exclude the presence of elements or steps other than those stated in a claim.

The article "a" or "an" preceding an element does not exclude the presence of a plurality of such elements. The present disclosure may be implemented by means of hardware comprising several distinct elements, and by means of a suitably programmed computer. In the system claim enumerating several elements, several of these elements (sub-systems) may be embodied by one and the same item of hardware. The mere fact that certain measures are recited in mutually different dependent claims does not indicate that a combination of these measures cannot be used.

REFERENCES

Cai et al (2017). Improving Deep Pancreas Segmentation in CT and MRI Images via Recurrent Neural Contextual Learning and Direct Loss Function, Medical Image Computing and Computer-Assisted Intervention—MICCAI, Publisher: Springer, pp. 674-682

Cicek et al (2016) 3d u-net: learning dense volumetric segmentation from sparse annotation. In International Conference on Medical Image Computing and Computer-Assisted Intervention, pages 424-432. Springer He et al (2016) Deep residual learning for image recognition. In Proceedings of the IEEE conference on computer vision and pattern recognition, pages 770-778

Ioffe and Szegedy (2015) Batch normalization: Accelerating deep network training by reducing internal covariate shift. In International Conference on Machine Learning, pages 448-456

Kamnitsas et al (2017) Efficient multi-scale 3d CNN with fully connected CRF for accurate brain lesion segmentation. Medical Image Analysis, 36:61-78

Milletari, et al (2016) Fully Convolutional Neural Networks for Volumetric Medical Image Segmentation, Fourth International Conference on 3D Vision.

Rudwaleit et al (2004). How to diagnose axial spondyloarthritis early. Annals of the rheumatic diseases, 63(5), 535-43

Strandet et al (2017). Evaluation and Management of the Patient With Suspected Inflammatory Spine Disease, Mayo Clinic Proceedings, vol. 92, issue 4: 555-564.

Szegedy et al (2015) Going deeper with convolutions. In Proceedings of the IEEE conference on computer vision and pattern recognition, pages 1-9

WO 2015/191613

What is claimed is:

1. A medical image analysis system for predicting a presence of lesions indicative of axial spondyloarthritis in a subject, the system comprising:
   an image processor configured for receiving and processing one or more MRI image data set of the subject, the MRI image data set containing a pelvic region and a sacroiliac joint, the image processor configured for dividing the MRI image data set into a set of 3D voxels;
   a voxel classifier configured for calculating for each of the 3D voxels in the set of 3D voxels one or more class probabilities of such voxel to contain a lesion of a particular lesion type or being a non-lesion, the class probabilities being calculated using a computational model;
   a lesion probability map generator configured for receiving the data produced by the voxel classifier and producing a probability intensity map for each of the lesion types, in which one or more areas classified as being a lesion are highlighted; and
   an image display configured for displaying an output of the lesion probability map generator.

2. The system of claim 1, wherein the MRI image data set comprises image intensities, the image intensities having a dynamic signal range.

3. The system of claim 1, wherein the MRI image data set includes at least one of a MRI STIR image data and STIR image data.

4. The system of claim 1, wherein the image processor is configured for producing two or more sets of 3D voxels from a same MRI image data and the two or more sets of 3D voxels are provided to the voxel classifier separately.

5. The system of claim 4, wherein each of the 3D voxel sets consists of voxels of equal size, each voxel size being different in each of the 3D voxel sets.

6. The system of claim 1, wherein the image processor is additionally configured for identifying and extracting the pelvic region and the sacroiliac joint prior to processing of the MRI image data.

7. The system of claim 6, wherein the identification of the pelvic region and the sacroiliac joint is done using a segmentation method based on a classification technique.

8. The system of claim 1, wherein the image processor is configured to further divide the set of 3D voxels into groups and to provide the groups to the voxel classifier separately.

9. The system of claim 1, wherein the image processor is configured to normalize the MRI image intensities.

10. The system of claim 1, wherein the image processor is additionally configured to perform histogram stretching.

11. The system of claim 1, wherein the computational model for calculating the class probabilities has been trained using a training data set containing MRI image data, wherein areas containing a lesion of a particular class have been marked and pre-classified.

12. The system of claim 1, wherein the computational model for calculating the class probabilities uses a Convolutional Neural Network comprising a set of neural network layers, wherein a sequence of the neural network layers comprises:
   for each set of voxels, one or more convolutional layers configured to receive an input derived from said set of voxels in a context of the surrounding voxels to generate two or more convolved outputs;
   one or more fully connected layers configured for aggregating said two or more convolved outputs; and
   a classification layer configured for receiving an input from said one or more fully connected layers to perform final classification.

13. The system of claim 1, wherein the computational model is trained using a MRI training data set generated using a method comprising following steps:
   i. receiving a MRI image data containing pelvic region and sacroiliac joint,
   ii. dividing the MRI image data into a set of 3D voxels;
   iii. processing the MRI image data and generating one or more 3D layers;
   iv. for each said 3D layer, highlighting using a display, a lesion area and providing a lesion class label;
   v. producing a data set containing spatial coordinates of each highlighted lesion area together with the lesion class label associated with the highlighted lesion area;
   vi. processing the data set and generating file containing the spatial coordinates and the lesion class label that is an equivalent resolution to the 3D voxel set;
   vii. producing for the 3D voxel set a file containing for each of such voxels 0 or 1 per lesion class;
   viii. providing the computational model with the set of 3D voxels and for each lesion type a file containing, for each corresponding voxel of the MRI image data, an indication of 0 or 1 of such voxel to contain a lesion of such lesion type.

14. The system of claim 13, wherein the 3D layers in the step (iii) of the method are 0.5-5 mm thick.

15. The system of claim 13, wherein the MRI image data in the method is normalized prior to the dividing of the MRI image data into the set of 3D voxels.

16. The system of claim 1, wherein the lesion probability map generator is configured to produce the probability intensity map by removing values below a particular threshold.

17. The system of claim 1, wherein the probability intensity map is in a form of image data.

18. The system of claim 1, wherein the lesion probability map generator is configured to produce the probability intensity map by removing values below a particular threshold for each of the lesion types.

19. The system of claim 1, wherein the lesion probability map generator is configured to produce the probability intensity map by averaging probabilities over a subset of voxels.

20. The system of claim 1, wherein the image display is configured to provide an overlay of the data of the lesion probability map generator onto the MRI image data set.

21. The system of claim 1, wherein the image display is configured to display the output of the lesion probability map generator per lesion type.

22. The system of claim 1, wherein the image display is configured to display the output of the lesion probability map generator by overlaying the probability intensity map and original MRI image data of the MRI image data set.

23. The system of claim 1, wherein the output of the lesion probability map generator and the source MRI data of the MRI image data set are transmitted in a form of an image data file.

24. A medical image analysis method for predicting a presence of lesions indicative of axial spondyloarthritis in MRI image data, the method comprising:
 a) receiving one or more MRI image data set of a subject, data of MRI image data set containing pelvic region and sacroiliac joint image data;
 b) dividing the MRI image data set into a set of 3D voxels;
 c) calculating, using a computational model, for each of 3D voxels one or more class probabilities of such 3D voxel to contain a lesion of a particular type or being a non-lesion;
 d) outputting based on the calculated probabilities an indicator of presence of lesions, wherein the method is carried out by the medical image analysis system according to claim 1.

25. A non-transitory computer-readable medium storing thereon executable instructions, that when executed by a computer, cause the computer to execute the method for predicting the presence of lesions indicative of axial spondyloarthritis in MRI image data according to claim 24.

26. A medical imaging workstation comprising:
 an MRI machine for generating at least one MRI image of a subject; and
 the system as recited in claim 1 for predicting the presence of lesions indicative of axial spondyloarthritis in the subject.

* * * * *